UNITED STATES PATENT OFFICE 2,596,641

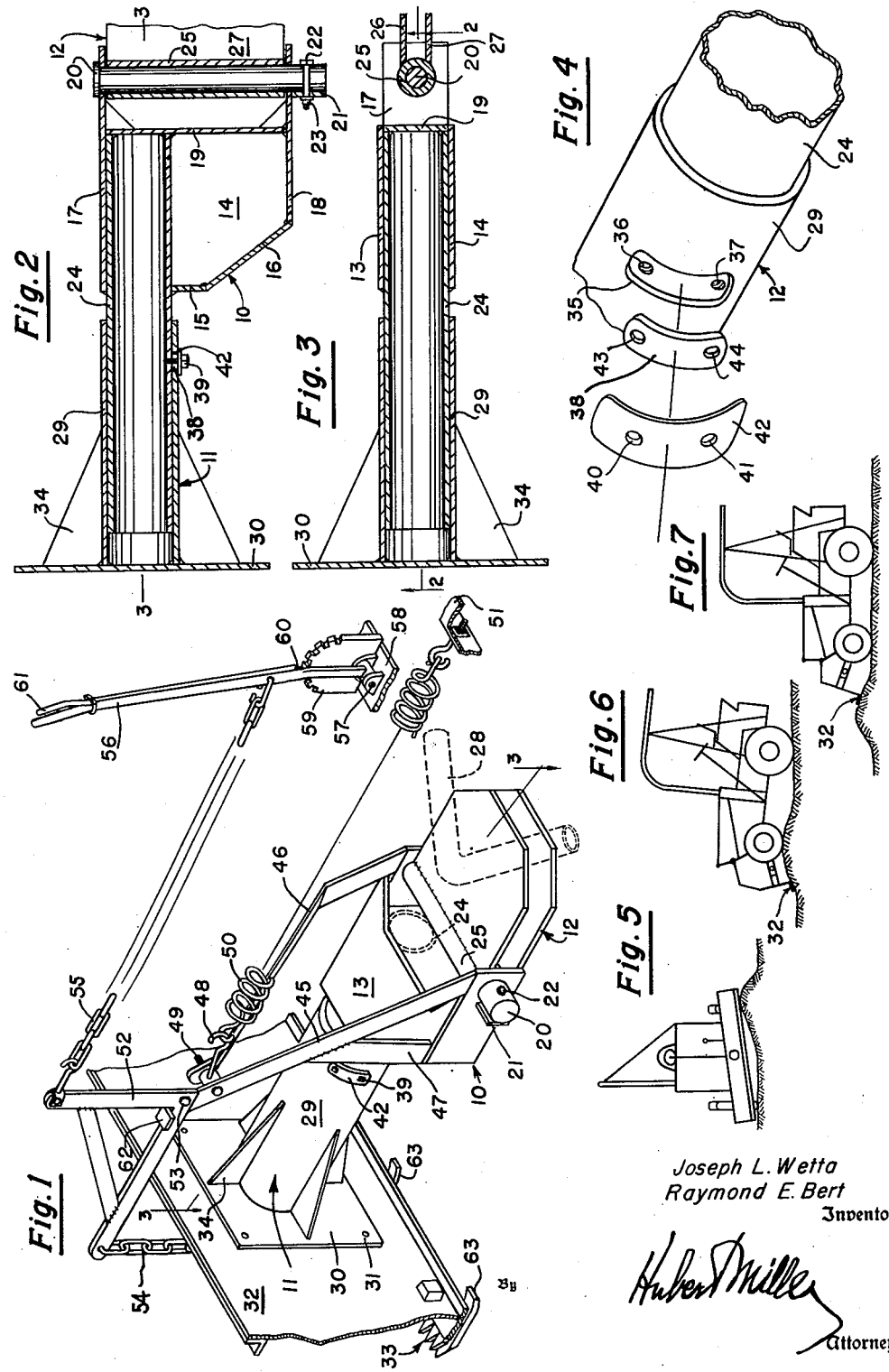

CUTTER BAR MOUNTING AND CONTROL FOR CROP CUTTING VEHICLES

Raymond E. Bert and Joseph L. Wetta, Maize, Kans.

Application November 17, 1948, Serial No. 60,457

7 Claims. (Cl. 56—25)

This invention relates generally to agricultural crop cutting machines, and more particularly to a new and novel means for mounting the cutter bar on such machines.

All crop cutting implements with which we are familiar provide for a vertical adjustment of the cutter bar or sickle to vary its cutting position above the ground. When the sickle is set at a desired height this position is maintained because the sickle is rigidly connected to the frame of the agricultural vehicle. With such vehicles, irregularities in ground surface seriously affect the sickle operation unless the cutter bar is aligned laterally with two wheels which are on opposite sides of the vehicle. If the cutter bar is either ahead of or behind these wheels it does not maintain its spacing from the ground when irregularities are encountered. If a ground bump is encountered, the teeth of the cutter dig into the ground, either before or after the vehicle wheels reach and travel over the bump. If a depression in the ground is encountered, the teeth dig into the ground either on the near side or far side of the depression, because of the tilt assumed by the vehicle frame when the wheels encounter the depression. This gouging contact of the cutter bar with the ground shortens its life considerably, often damages the cutter bar seriously, and many times renders the implement useless until repairs can be made.

It is a primary object of the invention to provide a means for mounting a cutter bar or sickle on a crop cutting vehicle which permits the cutter bar to follow the contour of the ground over which it travels regardless of the irregularities in such ground contour, and regardless of the positions assumed by the vehicle frame as a result of its wheels passing over such irregularities.

It is another object to provide a cutter bar mounting which permits the cutter bar to pivot about an axis substantially parallel to the direction of travel of the vehicle to which it is attached, and to simultaneously or independently pivot about a lateral axis normal to the first mentioned axis.

It is an additional object to provide a cutter bar mounting having the mentioned characteristics which permits the cutter bar to traverse the ground on skids which are in actual contact with the ground, and which serve to change the position of the cutter bar in accordance with irregularities in the ground contour, independent of the relative position of that part of the vehicle to which the cutter bar is attached.

It is an additional object of the invention to provide a position adjusting control mechanism for the cutter bar which automatically levels the cutter bar when it is raised into a position in which it does not contact the ground.

The construction of a preferred embodiment of the invention, together with other objects attending its production, will be more clearly understood when the following description is read in connection with the accompanying drawings, which are presented for illustrative purposes only, and in which:

Fig. 1 is an isometric view of a preferred embodiment of the invention, certain cooperating parts of the vehicle to which it is attached being shown fragmentarily;

Fig. 2 is a central horizontal longitudinal sectional view of the invention taken on line 2—2 of Fig. 3;

Fig. 3 is a vertical longitudinal sectional view taken on line 3—3 of Fig. 1, the cutting plane passing through the longitudinal axis of the device;

Fig. 4 is an isomeric exploded view of a portion of the device showing details of construction; and Figs. 5, 6, and 7 are schematic views illustrating the operation of the invention when installed on a crop cutting farm implement.

Like numerals designate like parts in all the figures.

Referring to Figs. 1, 2, and 3, it will be seen that the invention includes a central yoke member, designated as a whole by the numeral 10; a cutter bar or sickle supporting member mounted on the forward end of the yoke member for oscillation about a longitudinal axis, and designated as a whole by the numeral 11; and a coupling member for pivotally connecting the rear end of the yoke to an agricultural machine, the pivot axis being normal to the longitudinal pivot axis of the cutter bar supporting member 11, and the coupling as a whole being designated by the numeral 12.

The yoke 10 is of box construction and is built up of heavy plates welded together. It includes a top plate 13, a bottom plate 14, two forward end plates 15 and 16, side plates 17 and 18, and a rear end plate 19. The side plates 17 and 18 extend rearwardly beyond the end plate 19, and are provided near their ends with aligned apertures for receiving a shaft 20. A lug 21 projects rigidly from the outer surface of the plate 18 at a point adjacent the shaft. This lug is provided with a hole adapted to receive the end of a bolt 22 which also passes through a transverse aperture near the end of the shaft and when held in position by the nut 23 serves to prevent both rotative and endwise movement of the shaft with relation to the yoke.

The forward end of the yoke 10 is in the form of a heavy shaft 24, which in this instance is in the form of a heavy metal tube the rear end of which is welded to the plate 19, and the wall of which is welded to the top and bottom plates 13 and 14, side plate 17, and end plate 15, as shown.

The shaft 20 is journaled in an interiorly ground tube or sleeve 25 which constitutes the forward end of the coupling. Spaced heavy plates 26 and 27 have their forward ends welded to the tube 25, completing the coupling structure. The plates 26 and 27 are adapted to be rigidly secured to a part 28 of the vehicle, as indicated in Fig. 1.

The cutter bar supporting member consists of a heavy casing or tube 29 adapted to receive and journal a major portion of the protruding forward end of the shaft 24. The forward end of this casing rigidly carries a transverse plate 30, which has perforations 31 to facilitate the attachment thereto of a grain pan 32 or other supporting structure for a cutter bar 33. Strengthening gussets 34 are welded to the plate 30 and to the wall of the casing 29 at spaced points around the casing, as shown. The term cutter bar, as used hereinafter including the claims, includes not only the cutter bar itself but also its supporting structure.

As a means of limiting the oscillative movements of the member 11 and consequently of the cutter bar carried by it, and also as a means of preventing relative axial movement between the casing 29 and the shaft 24, the casing is provided with a circumferential wall slot 35, clearly shown in Fig. 4. The shaft 24 is provided with threaded stud holes 36 and 37. An arcuate stop member 38 is adapted to seat against the outer surface of the shaft 24 and within the wall slot 35, and to be held in such position by ordinary threaded studs 39 (Fig. 2). The studs first pass through holes 40 and 41 in an arcuate guard plate 42, then through similarly spaced holes 43 and 44 in the stop member, and are then screwed into the holes in the shaft, thus locking the shaft 24, the stop 38, and the plate 42 together. The width of the stop 38 is slightly less than the width of the slot 35, and the length of the stop is considerably less than the length of the slot. Since the thickness of the stop 38 is just slightly greater than the wall thickness of the casing 29, the arrangement described permits the casing 29 to oscillate on the shaft 24, but the contact of the ends of the stop with the respective ends of the slot 35 positively limit the movement of the casing in both directions about its axis. The sliding contact of the sides of the stop 38 with the respective sides of the slot 35 likewise prevent endwise movement of the casing on its shaft. The plate 42 simply prevents dust and dirt from entering the space between the casing and its shaft through the slot 35.

The control mechanism for the unit includes an upright frame which is rigidly secured at its lower end to the yoke 10. The frame consists of heavy metal straps 45 and 46 and one or more braces 47. The upper ends of these straps have aligned perforations and pivotally hold between them a hook 48, by means of a bolt 49. The hook 48 anchors one end of a spring 50, the other end of which is similarly anchored to a suitable rigid portion 51 of the vehicle. This spring, acting through the frame on the yoke 10, has sufficient tension to counterbalance the major portion of the weight forward of the pivot axis 20, including the cutter bar supporting structure.

As a lost motion connection between the frame and the cutter bar, the frame strap 45 carries a bell crank 52, pivoted at 53. The horizontal arm of this bell crank is connected to the grain pan or other cutter bar supporting structure 32 by means of a flexible member 54, such as a chain, as shown, or a flexible cable. The upright arm of the bell crank 52 is connected by a chain 55, or other suitable means, to some suitable means for applying a lifting force to the bell crank. For illustrative purposes only, this lifting means is shown as a lever 56 pivoted at 57 to a fixed part 58 of the vehicle. A fixed toothed quadrant 59 cooperates with a lever carried detent 60, controlled by a pivoted handle 61.

Before describing the operation of the invention, it should be noted that a stop 62 is provided to limit the movement of the bell crank 52 in a cutter bar lifting direction. In this instance the stop is provided by bending the extreme upper end of the strap 45 into the path of travel of the horizontal arm of the bell crank. Another item to be noted is that the point of connection between the grain pan supporting structure 32 and the bell crank 52 is spaced to one side of the longitudinal axis (shaft 24) about which the cutter bar oscillates. Last, but not least, it should be noted that the cutter bar itself is provided with a plurality of spaced ground contacting skids 63.

Operation

With the cutter bar mounted on a vehicle by means of the above described structure, the lever 56 is released and moved forward. This permits the yoke 10 to pivot about its axis 20, and also permits the bell crank 52 to pivot about its axis 53. The cutter bar is thus lowered until its skids 63 are in ground contact. As the vehicle moves along the ground, the skids 63 contact ground bumps. If the bump is in the form of a transverse ridge the skids raise the cutter bar causing the mounting to pivot about its transverse axis 20, as shown in Fig. 7. As the cutter bar passes the crest of the ridge it travels downward on the opposite side of the ridge, independent of the relative position of the vehicle frame to which the mounting is attached, as clearly shown in Fig. 6. In this particular illustration the front wheels of the vehicle have reached the crest of the ridge and the vehicle frame has consequently been tilted upward. Nevertheless, the cutter bar, due to its freedom of movement, is following the ground contour.

Fig. 5 illustrates the position assumed by the cutter bar on encountering a ground bump at one side of the longitudinal pivot axis 24 of the mounting structure. One or more of the skids on the cutter bar have contacted the bump and have forced the entire cutter bar to pivot about this axis, independent of the ground wheels of the vehicle on which the cutter bar is mounted.

When the crop has been cut, or when it is desirable for any other reason to move the vehicle along the ground with the cutter bar in an elevated position, it is only necessary for the operator to move the lever 56 rearward. This movement pivots the bell crank 52 until it contacts the stop 62. Further lever movement causes the cutter bar to be raised, the mounting structure pivoting about its transverse axis 20. Since the lifting force is applied at a point spaced laterally from the longitudinal pivot axis 24, the lifting of the cutter bar also serves to level it transversely with relation to the vehicle on which it is mounted. This is true because the cutter bar supporting structure 32 is purposely balanced so that one of its ends is heavier than the other, the heavy end being located on the same side of the longitudinal axis 24 as the bell crank 52.

We claim:

1. A cutter bar mounting for crop cutting vehicles comprising: an elongated coupling member having a laterally disposed tubular bearing sleeve at one end, its other end being adapted to be rigidly attached to the vehicle with the coupling member disposed fore and aft with relation thereto; an elongated cylindrical shaft having an integral bifurcated yoke at its aft end, the free ends of the two legs of the yoke having laterally aligned perforations therein; a hinge pin extending through the perforations in the yoke and through said bearing sleeve forming a lateral substantially horizontal pivot axis for said shaft; a cutter bar supporting member including a transverse plate and a fore and aft disposed sleeve journaled on the forward portion of said shaft for oscillation in a plane normal thereto; a circumferentially elongated aperture through the wall of said fore and aft sleeve exposing a portion of said shaft; and a stop member seated in said aperture and fixed to said shaft to limit the oscillation of the sleeve in both directions, and to maintain the fore and aft position of the sleeve with relation to the shaft.

2. The invention described in claim 1 and a rigid frame having one end rigidly secured to said yoke and projecting upward therefrom; and resilient means connected to the upper end of the frame and to the vehicle to counterbalance the major portion of the weight forward of the lateral axis of said yoke.

3. The invention described in claim 2 and a bell crank lever mounted on the upper end of said frame on a transverse pivot axis, one arm of the crank extending forward and terminating above the transverse plate of the cutter bar supporting member, the other arm of the crank extending upward from its pivot point; linkage connecting the end of the forwardly extending arm of the bell crank to the transverse plate at a point spaced laterally from the fore and aft axis of the cutter bar supporting member; and means connected to the upwardly extending arm of the bell crank and to the vehicle for rocking the bell crank about its pivot axis.

4. The invention described in claim 3, and a fixed stop on said frame for limiting the upward pivotal movement of the forward extending bell crank arm.

5. A cutter bar mounting for crop cutting vehicles comprising: a transversely disposed cutter bar supporting member which includes a rearwardly projecting elongated tubular socket disposed normally with relation to the transverse portion; a fore and aft disposed shaft having its forward end journaled in said socket; cooperating means on the shaft and on the socket positively maintaining the relative axial positions of the two while affording positively limited relative oscillatory movement of the socket about the shaft; a bifurcated fore and aft disposed yoke fixed on the aft end of said shaft, the aft ends of the two legs of said yoke having laterally aligned perforations therein; a coupling member having its aft end rigidly connected to the vehicle; a transversely disposed elongated tubular bearing at the forward end of the coupling member adapted to be received between the legs of the yoke; a hinge pin passing through the perforations in the legs of the yoke and through said bearing; an upwardly projecting rigid frame carried by said yoke; and spring means connecting the upper end of the yoke frame and the vehicle for counterbalancing a major portion of the weight of the mounting forward of said hinge pin.

6. The invention described in claim 5 in which the cutter bar supporting member is heavier on one side of the pivot axis of its socket than on the other side, lost motion means connecting the upper end of said frame and the transverse portion of the cutter bar supporting member; said lost motion means being connected to the heavy side at a point spaced from said pivot axis.

7. The invention described in claim 5, and means connected to the upper end of said frame and to the vehicle for pivoting the cutter bar supporting member about its lateral hinge pin axis to vary the level of the cutter bar.

RAYMOND E. BERT.
JOSEPH L. WETTA.

REFERENCES CITED

The following references are of record in the file of this patent:

UNITED STATES PATENTS

| Number | Name | Date |
|---|---|---|
| 1,092,722 | Kluge | Apr. 7, 1914 |
| 1,105,751 | Bruce | Aug. 4, 1914 |
| 2,111,016 | Worthington | Mar. 15, 1938 |
| 2,207,353 | Picha | July 9, 1940 |
| 2,299,859 | Speiser | Oct. 27, 1942 |
| 2,335,541 | Ronning | Nov. 30, 1943 |
| 2,468,313 | Turner | Apr. 26, 1949 |

FOREIGN PATENTS

| Number | Country | Date |
|---|---|---|
| 417,152 | France | Aug. 23, 1910 |
| 566,715 | Great Britain | Jan. 10, 1945 |